United States Patent
Leiber

[11] 3,836,206
[45] Sept. 17, 1974

[54] HYDRAULIC UNIT

[75] Inventor: Heinz Leiber, Leimen, Germany

[73] Assignee: Teldix GmbH, Heidelberg, Germany

[22] Filed: Sept. 28, 1973

[21] Appl. No.: 401,805

[30] Foreign Application Priority Data
Oct. 12, 1972  Germany............................ 2249956

[52] U.S. Cl..................... 303/10, 137/114, 188/1 A, 303/84 A
[51] Int. Cl............................................. B60t 13/16
[58] Field of Search............. 303/10, 84 A, 84 R, 2, 303/9, 6 R, 63, 21 AF; 340/52 C; 200/81.9 M, 82 D; 188/1 A, 151 A; 137/486, 109, 114

[56] References Cited
UNITED STATES PATENTS

| | | | |
|---|---|---|---|
| 2,729,226 | 1/1956 | Jones............................... | 303/84 A |
| 3,220,780 | 11/1965 | Nakamura......................... | 303/84 A |
| 3,549,212 | 12/1970 | Leiber................................... | 303/63 |
| 3,674,317 | 7/1972 | Mangold......................... | 303/21 A F |
| 3,792,433 | 2/1974 | Wada................................. | 188/1 A |

*Primary Examiner*—Trygve M. Blix
*Assistant Examiner*—D. C. Butler
*Attorney, Agent, or Firm*—Spencer & Kaye

[57] ABSTRACT

An hydraulic unit for supplying two separate supply circuits comprises two pumps connected to a reservoir, both pumpshaving output lines, piston members for detecting the output pressures and a normally closed valve connecting the output lines and operable in response to detected output pressures which are below a predetermined pressure.

11 Claims, 1 Drawing Figure

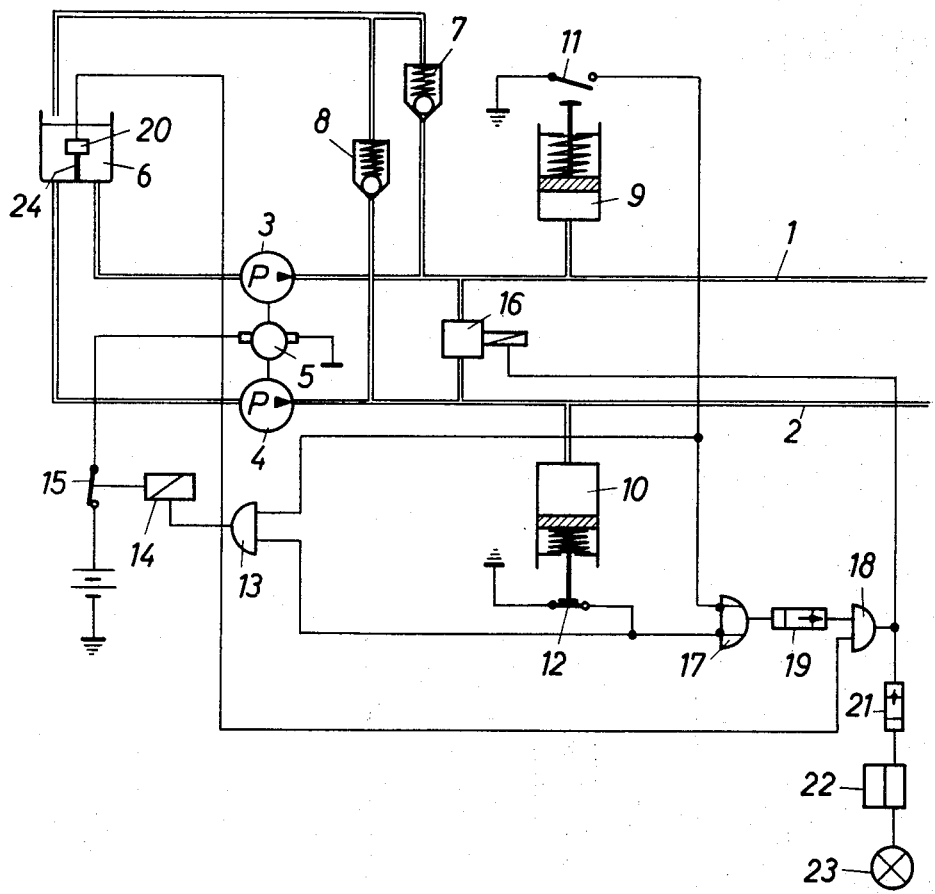

HYDRAULIC UNIT

BACKGROUND OF THE INVENTION

The invention relates to a hydraulic unit for two separate supply circuits, particularly braking circuits. Such a unit may comprise two pumps connected to one fluid reservoir, which pumps have preferably a common drive and a hydraulic store each connected in the output line of each pump, in a braking system between each pump and the associated brake control valve, as well as switching means for detecting a sufficient supply pressure at the two outputs.

Such hydraulic units are known per se. In this connection reference is made to a brochure by Clayton Dewandre Company Limited with the title "Clayton Dewandre Full-Power-Hydraulic Braking System, on British Leyland Terrier Vehicles." In the case of the braking system described there, each of two braking circuits is provided with a reservoir, a pump connected thereto and having a limiter for limiting the maximum value of the output pressure, a gas store for the brake fluid pumped by the pump and a low-pressure switch connected into the output line of the pump store unit, which actuates a warning when the pressure of the hydraulic pressure unit is too low. The two output lines of this storage unit, constructed completely identically for the two braking circuits, are then connected to the brake pressure control valve to be actuated by the driver.

With the failure of one pump or with the occurrence of a leak, the corresponding braking circuit fails; the other braking circuit then remains in operation as a result of the use of a divided reservoir and the driver is warned of a failure of one braking system by means of a warning indicator.

SUMMARY OF THE INVENTION

It is an object of the invention to prevent the failure of a supply circuit with the failure of the associated pump in the case of such a hydraulic storage unit. It is assumed here that two failures do not occur simultaneously.

In accordance with the invention there is provided a hydraulic unit for supplying two separate supply circuits comprising a reservoir, two pumps connected to said reservoir, an output line connected to each said pump, detecting means for detecting the output pressure of each said output line and a normally closed valve connecting said output lines and responsive to said detecting means for opening communication between said output lines if said detecting means detects a pressure in one of said output lines which is below a predetermined pressure.

BRIEF DESCRIPTION OF THE DRAWING

The invention will now be described in greater detail, by way of example, with reference to the drawing, the single FIGURE of which shows schematically one embodiment of the invention.

DESCRIPTION OF THE PREFERRED EMBODIMENT

Basically the invention proposes to provide a hydraulic unit for supplying two separate supply circuits and comprising two pumps, each with an output line and each connected to a reservoir, and a normally closed valve connecting the output lines and opened on detection of a pressure at the output lines below a predetermined pressure.

Preferably a hydraulic store is connected into each output line. Suitably the valve is a magnetic valve and pressure detection is carried out by switch means. Furthermore the pumps suitably have a common drive.

The hydraulic unit in accordance with the invention is particularly suitable for use with two-circuit brakes. One or both supply circuits can, however, also be used for other purposes, e.g., for level regulation of the vehicle steering assistance and so on. If more than two pressure supply circuits are provided, the invention can be employed a number of times for connecting the different supply circuits.

As in the case of the prior art, the switching means for detecting a sufficient supply pressure can comprise pressure sensors, which produce a signal when the pressure falls below a predetermined specified minimum. This signal causes actuation of the valve to its open position. It is, however, also possible to provide the stores with so-called limit switches, which are actuated when the stores have been filled to a predetermined extent - which corresponds to a specified pressure - thus a signal change is caused when the fluid in the stores drops below this amount. This signal change energizes the magnetic valve which opens as a result. The switches can, at the same time, be limit switches for the pump drive so that when filling a store, the associated drive or, with common drive after filling both stores, the common drive is switched off.

If one of the pumps fails, the still serviceable pump will thus supply both circuits. A time circuit is provided for maintaining the control signal for the magnetic valve for a predetermined time. However, in the case of a fluid leak in one circuit, in order to prevent all the brake fluid from being pumped into this circuit, a fluid state indicator is provided for the reservoir, which responds when the fluid drops below a predetermined minimum. The resultant signal is then used to block the magnetic valve, and thus prevent brake fluid from passing into the leaking circuit by way of the valve.

In addition, a warning indication can be provided, which, for example, also responds when the magnetic valve responds, the warning state being stored, for example, in a bistable stage which is changed over by the warning signal. This bistable stage then, in turn, actuates the warning.

In the case of the solution described above, small cheap piston stores can be used, since the energy store for the electrical drive is provided by the storage battery.

Of course, according to the importance of the circuit, inflated stores (hydraulic stores) with an air spring can also be used.

Referring now to the drawings, there is shown a hydraulic storage unit with two output lines 1 and 2, which, for example, are connected to the brake control valve (not shown) of the vehicle. The brake pressure in the two lines 1 and 2 is produced by pumps 3 and 4 which have a common motor drive 5. The pumps 3 and 4 draw the brake fluid out of the reservoir 6. For reasons of safety, relief valves 7 and 8 are provided to prevent any excessive pressure from developing.

Piston stores 9 and 10, the pistons of which close switches 11 and 12 when the stores are filled to a predetermined extent (and thus at a predetermined pressure) are connected to the lines 1 and 2. If both switches are closed, a relay 14 is energized through an AND gate 13 and a switch 15 is opened. Thus the pump drive is interrupted. In practice, the relay 14 will be further influenced by other signals, but this is of no importance here, since it is merely to be indicated that the switches 11 and 12 can stop the pump drive.

A magnetic valve 16 which normally blocks the connection between the lines 1 and 2, is located between these lines. If at least one of the switches 11 or 12 is not closed indicating that insufficient pressure is present in the associated line, a signal appears at the magnetic valve 16 through an OR gate 17 with negated inputs and an AND gate 18 connected thereafter. The valve is energized and opens the connection between the lines 1 and 2. A time element 19 causes the output signal of the OR gate 17 to be extended by a specified time (e.g., 0.5 sec), so that with an immediate disappearance of the output signal of the OR gate, the connection is not immediately separated again. This time element can also cause a slight delay in the response of the valve 16 so that the valve only opens if the reduction of the pressure in the circuit lasts for a predetermined short time. The control signal for the magnetic valve 16, however, appears at the valve only if a signal of a fluid state indicator 20 is present, which signal disappears when the fluid in the reservoir drops below a predetermined amount keeping the AND gate 18 open. If the output signal of the AND gate 18 occurs for a predetermined time (time element 21) it changes over a bistable element 22 and thus causes a warning lamp 23 to light up.

In normal operation, the stores 9 and 10 are full. Thus the magnetic valve is not actuated. However, if one pump fails the associated store will be emptied on braking and the corresponding contact 11 or 12 opened. As a result the magnetic valve 16 is actuated, that is to say the other braking circuit is simultaneously supplied from the remaining operative pump. At the same time the failure is indicated. If the circuit without a pump still leaks in addition, all the brake fluid is prevented from being pumped into the leaking circuit by evaluation of the signal of the fluid state indicator of the reservoir, the connection between the lines 1 and 2 being again blocked in good time before all the brake fluid is lost.

If a leak has occurred in a circuit, the magnetic valve 16 also responds. The pumping of all the brake fluid into the leaking circuit by the pump belonging to the leaking circuit can be avoided by dividing the reservoir into two parts. Thus the division can be such that the division is effective on reaching a predetermined minimum amount to be indicated by the fluid state indicator 20. This situation is indicated by the wall 24 in the drawing. By this, the minimum amount assigned to a circuit is maintained for that circuit which is still operative in the case of a leak in the other circuit.

The limit switches and/or the switches of the fluid state indicator can be constructed as a magnetic field sensitive semiconductor plates) which, with corresponding proximity of a magnet or of a part affecting the magnetic flux through the semiconductors, causes a switching operation.

The above mentioned warning lamp can also be permitted to light up occasionally, for example, after starting (where pressure has to be built up first). The disappearance of the light indication then shows that the unit is operating correctly. This control path for the warning lamp should not contain any store, and must thereafter be rendered inoperative so that it can serve to provide the failure warning.

It will be understood that the above description of the present invention is susceptible to various modification changes and adaptations.

What is claimed is:

1. A hydraulic unit for supplying two separate supply circuits comprising a reservoir, two pumps connected to said reservoir, an output line connected to each said pump, detecting means for detecting the output pressure of each said output line and a normally closed valve connecting said output lines and responsive to said detecting means for opening communication between said output lines if said detecting means detects a pressure in one of said output lines which is below a predetermined pressure.

2. A unit as defined in claim 1, and further comprising a hydraulic store connected into each said output line.

3. A unit as defined in claim 2, wherein said hydraulic stores comprise small piston stores.

4. A unit as defined in claim 2, wherein said normally closed valve comprises a magnetic valve and said detecting means comprise a switching means associated with each said output line.

5. A unit as defined in claim 4, and further comprising a common drive for both said pumps.

6. A unit as defined in claim 4 and further comprising warning indication means responsive to actuation of said magnetic valve.

7. A unit as defined in claim 4, wherein said switching means comprise switches actuated in dependence on the amount of fluid in an associated one of said hydraulic stores.

8. A unit as defined in claim 7, and further comprising logic switching elements connecting said switches to drive means for said pumps for cutting of drive from said pumps when said hydraulic stores contain a predetermined amount of fluid.

9. A unit as defined in claim 8, and further comprising means for maintaining said magnetic valve open for a predetermined period after its actuation.

10. A unit as defined in claim 7, and further comprising detecting means for detecting the amount of fluid in said reservoir and means responsive to said detecting means for preventing actuation of said magnetic valve when the amount of fluid in said reservoir falls beyond a predetermined amount.

11. A unit as defined in claim 10, in which the said reservoir is partly divided in two parts associated with the two pumps, the divided parts being effective on reaching a predetermined minimum amount of brake fluid.

* * * * *